(12) United States Patent
Kosaka

(10) Patent No.: US 11,186,420 B2
(45) Date of Patent: Nov. 30, 2021

(54) SIGNAL PROCESSING DEVICE, SEAL BREAKAGE DETECTING MODULE, PROGRAM, SEAL BREAKAGE DETECTING METHOD, AND ARTICLE PACKING ELEMENT

(71) Applicant: SONY CORPORATION, Tokyo (JP)

(72) Inventor: Hideo Kosaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 384 days.

(21) Appl. No.: 14/896,816

(22) PCT Filed: May 14, 2014

(86) PCT No.: PCT/JP2014/062884
§ 371 (c)(1),
(2) Date: Dec. 8, 2015

(87) PCT Pub. No.: WO2015/008528
PCT Pub. Date: Jan. 22, 2015

(65) Prior Publication Data
US 2016/0137380 A1    May 19, 2016

(30) Foreign Application Priority Data
Jul. 19, 2013    (JP) .............................. JP2013-150834

(51) Int. Cl.
*G08B 21/00*    (2006.01)
*B65D 79/02*    (2006.01)
(Continued)

(52) U.S. Cl.
CPC .............. *B65D 79/02* (2013.01); *A61J 1/035* (2013.01); *A61J 7/0409* (2013.01); *A61J 7/0418* (2015.05);
(Continued)

(58) Field of Classification Search
CPC ........ A61J 1/035; A61J 7/0409; A61J 7/0418; A61J 7/0436; A61J 7/0481; B65D 79/02; B65D 83/04
(Continued)

(56) References Cited

U.S. PATENT DOCUMENTS 4,616,316 A * 10/1986 Hanpeter .............. A61J 7/0481
206/531
4,617,557 A    10/1986 Gordon
(Continued)

FOREIGN PATENT DOCUMENTS

DE    10-2009-018285 A1    11/2010
JP    H02-257960 A    10/1990
(Continued)

OTHER PUBLICATIONS

Feb. 6, 2017, EP communication issued for related EP application No. 14825979.9.
(Continued)

*Primary Examiner* — Mark S Rushing
(74) *Attorney, Agent, or Firm* — Paratus Law Group, PLLC

(57) ABSTRACT

To be able to detect seal breakage of a container portion for containing an article by a simpler scheme, there is provided a signal processing device including: a processor that executes a program; and a memory that stores the program for causing the processor to function as a detection unit that transmits a signal to one or more signal lines formed of a breakable material in such a manner that the signal passes through regions corresponding to one or more respective container portions of a package for containing articles, and detects seal breakage of each container portion on the basis of whether the transmitted signal returns via each region.

11 Claims, 11 Drawing Sheets

(51) Int. Cl.
  *B65D 83/04* (2006.01)
  *B65D 75/32* (2006.01)
  *A61J 1/03* (2006.01)
  *A61J 7/04* (2006.01)
  *G01N 27/04* (2006.01)

(52) U.S. Cl.
  CPC ........... *A61J 7/0436* (2015.05); *A61J 7/0481* (2013.01); *B65D 75/327* (2013.01); *B65D 83/04* (2013.01); *G01N 27/045* (2013.01); *A61J 2200/30* (2013.01); *B65D 2203/12* (2013.01)

(58) Field of Classification Search
  USPC ...................................................... 340/568.2
  See application file for complete search history.

(56) References Cited

U.S. PATENT DOCUMENTS

| | | | |
|---|---|---|---|
| 5,412,372 | A | 5/1995 | Parkhurst et al. |
| 5,871,831 | A * | 2/1999 | Zeiter .................. A61J 7/0481 206/524.1 |
| 7,392,918 | B2 * | 7/2008 | Holloway .................. A61J 1/03 221/151 |
| 8,091,790 | B2 * | 1/2012 | Mickle .................. B65D 75/327 235/435 |
| 2003/0063524 | A1 | 4/2003 | Niemiec et al. |
| 2005/0122219 | A1 * | 6/2005 | Petersen .................. A61J 1/035 340/568.1 |
| 2008/0215289 | A1 * | 9/2008 | Sekura ................ G06F 19/3456 702/177 |
| 2009/0177827 | A1 * | 7/2009 | Perisich .................. G06F 13/24 710/262 |
| 2009/0189765 | A1 * | 7/2009 | Lev ....................... E05B 45/005 340/568.2 |
| 2013/0307683 | A1 * | 11/2013 | Greenberg ......... A47G 19/2227 340/539.1 |

FOREIGN PATENT DOCUMENTS

| | | |
|---|---|---|
| JP | H05-137257 A | 6/1993 |
| JP | H08-501013 A | 2/1996 |
| JP | H10-178715 A | 6/1998 |
| JP | 2004-503271 A | 2/2004 |
| JP | 2005-539300 A | 12/2005 |
| JP | 2008-151131 A | 7/2008 |
| JP | 2009-050129 A | 3/2009 |
| JP | 2012-130537 | 7/2012 |
| JP | 6699775 B2 | 5/2020 |
| WO | WO 96/04881 A1 | 2/1996 |

OTHER PUBLICATIONS

Aug. 23, 2017, CN communication issued for related CN application No. 201480032029.6.
Nov. 30, 2016, CN communication issued for related CN application No. 201480032029.6.
Feb. 27, 2018, EP Communication issued for related EP Application No. 14825979.9.
Mar. 12, 2018, Chinese Office Action issued for related CN Application No. 201480032029.6.
Mar. 27, 2018, Japanese Office Action issued for related JP Application No. 2015-527202.
Jul. 17, 2018, Japanese Office Action issued for related JP Application No. 2015-527202.
Dec. 10, 2019, European Search Report issued for related EP Application No. 19200857.1.

* cited by examiner

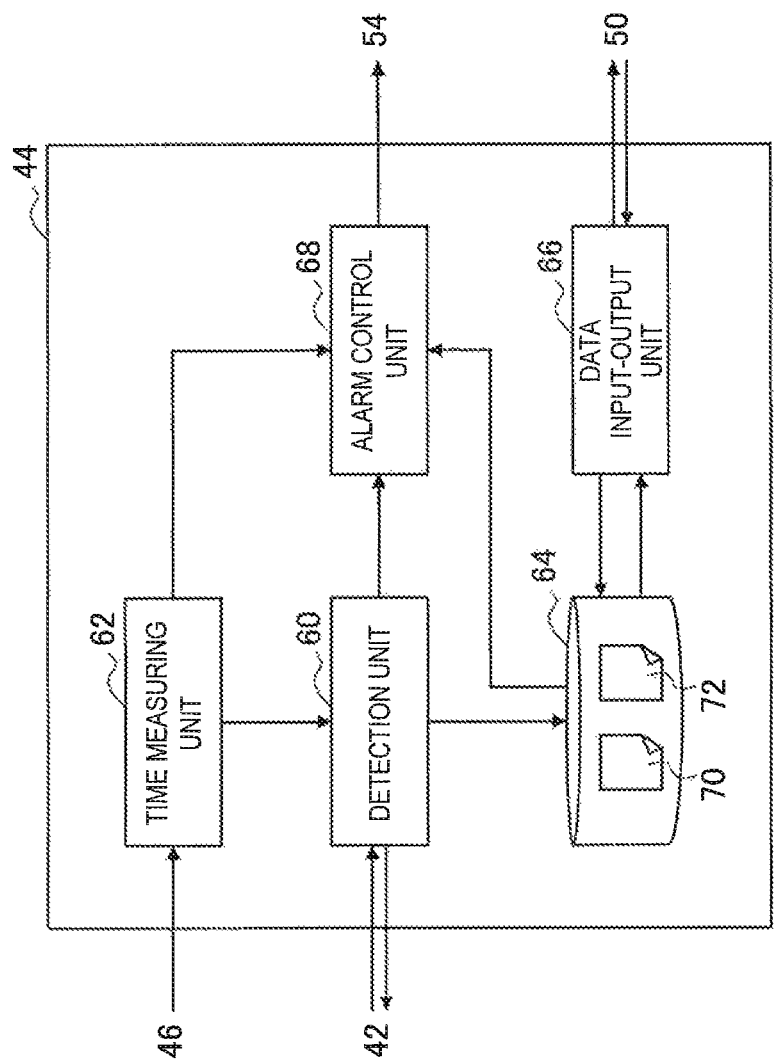

| USER ID | U0001 | ARTICLE ID | MED01 |
|---|---|---|---|
| SEAL BREAKAGE FLAG (#1) | True | SEAL BREAKAGE TIME (#1) | 2013/7/1 8:30:00 |
| SEAL BREAKAGE FLAG (#2) | True | SEAL BREAKAGE TIME (#2) | 2013/7/1 12:30:00 |
| : | : | : | : |
| SEAL BREAKAGE FLAG (#N) | False | SEAL BREAKAGE TIME (#N) | ---- |

| | 2013/7/1 8:30 |
|---|---|
| ADMINISTRATION SCHEDULE TIME | 2013/7/1 13:00 |
| | : |
| | 2013/7/4 8:30 |

SIGNAL PROCESSING DEVICE, SEAL BREAKAGE DETECTING MODULE, PROGRAM, SEAL BREAKAGE DETECTING METHOD, AND ARTICLE PACKING ELEMENT

TECHNICAL FIELD

The present disclosure relates to a signal processing device, a seal breakage detecting module, a program, a seal breakage detecting method, and an article packing element.

BACKGROUND ART

In the past, there has been proposed a scheme for automatically detecting breakage of a seal of a packing element of articles, for the purpose of administration management of medicine, or quality assurance at the time of transportation or storage of articles, etc. For example, below Patent Literature 1 proposes a method in which an electrically conductive circuit is embedded in a package to monitor a change of complex impedance due to seal breakage, in order to detect the seal breakage of the packing element.

CITATION LIST

Patent Literature

Patent Literature 1: U.S. Pat. No. 7,772,974B

SUMMARY OF INVENTION

Technical Problem

However, it is necessary to execute analogue-digital (AD) conversion to read the magnitude of electrical current flowing in the circuit, in order to detect the seal breakage on the basis of change of impedance (or resistance). The implementation of the AD converter increases the circuit size and the electric power consumption. Also, the requirement to keep the impedance of the package within an electrically monitorable range restricts the size and the shape of the package.

Thus, it is desirable to provide a scheme for detecting the seal breakage by a simpler scheme.

Solution to Problem

According to the present disclosure, there is provided a signal processing device including: a processor that executes a program; and a memory that stores the program for causing the processor to function as a detection unit that transmits a signal to one or more signal lines formed of a breakable material in such a manner that the signal passes through regions corresponding to one or more respective container portions of a package for containing articles, and detects seal breakage of each container portion on the basis of whether the transmitted signal returns via each region.

According to the present disclosure, there is provided a seal breakage detecting module including: a signal processing device; and one or more connection terminals that connects the signal processing device to the one or more signal lines; or a communication interface that transmits data recorded by the signal processing device to an external device.

According to the present disclosure, there is provided a program for causing a processor of a signal processing device to function as a detection unit that transmits a signal to one or more signal lines formed of a breakable material in such a manner that the signal passes through regions corresponding to one or more respective container portions of a package for containing articles, and detects seal breakage of each container portion on the basis of whether the transmitted signal returns via each region.

According to the present disclosure, there is provided a seal breakage detecting method executed by a processor of a signal processing device, the seal breakage detecting method including: transmitting a signal to one or more signal lines formed of a breakable material in such a manner that the signal passes through regions corresponding to one or more respective container portions of a package for containing articles; and detecting seal breakage of each container portion on the basis of whether the transmitted signal returns via each region.

According to the present disclosure, there is provided an article packing element including: a package that includes one or more container portions for containing articles; one or more signal lines that are formed of a breakable material and extend through regions corresponding to the one or more respective container portions of the package; and a seal breakage detecting module that transmits a signal to the one or more signal lines and detects seal breakage of each container portion on the basis of whether the transmitted signal returns via each region.

Advantageous Effects of Invention

According to the technology of the present disclosure, the seal breakage is detected by a simpler scheme. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an explanatory diagram for describing an example of a configuration of a logical function of a signal processing device.

FIG. 7 is an explanatory diagram illustrating an example of a configuration of seal breakage time data.

FIG. 8 is an explanatory diagram illustrating an example of a configuration of administration schedule data.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Also, the description will be made in the following order.
1. Overview of Article Packing Element
2. Exemplary Configuration of Seal Breakage Detecting Module
3. Exemplary Configuration of Signal Processing Device
    3-1. Overall Function and Configuration
    3-2. First Working Example
    3-3. Second Working Example
4. Flow of Process
    4-1. Seal Breakage Detecting Process (First Working Example)
    4-2. Seal Breakage Detecting Process (Second Working Example)
    4-3. Data Output Process
    4-4. Administration Support Process
5. Conclusion

1. Overview of Article Packing Element

Figure 1:
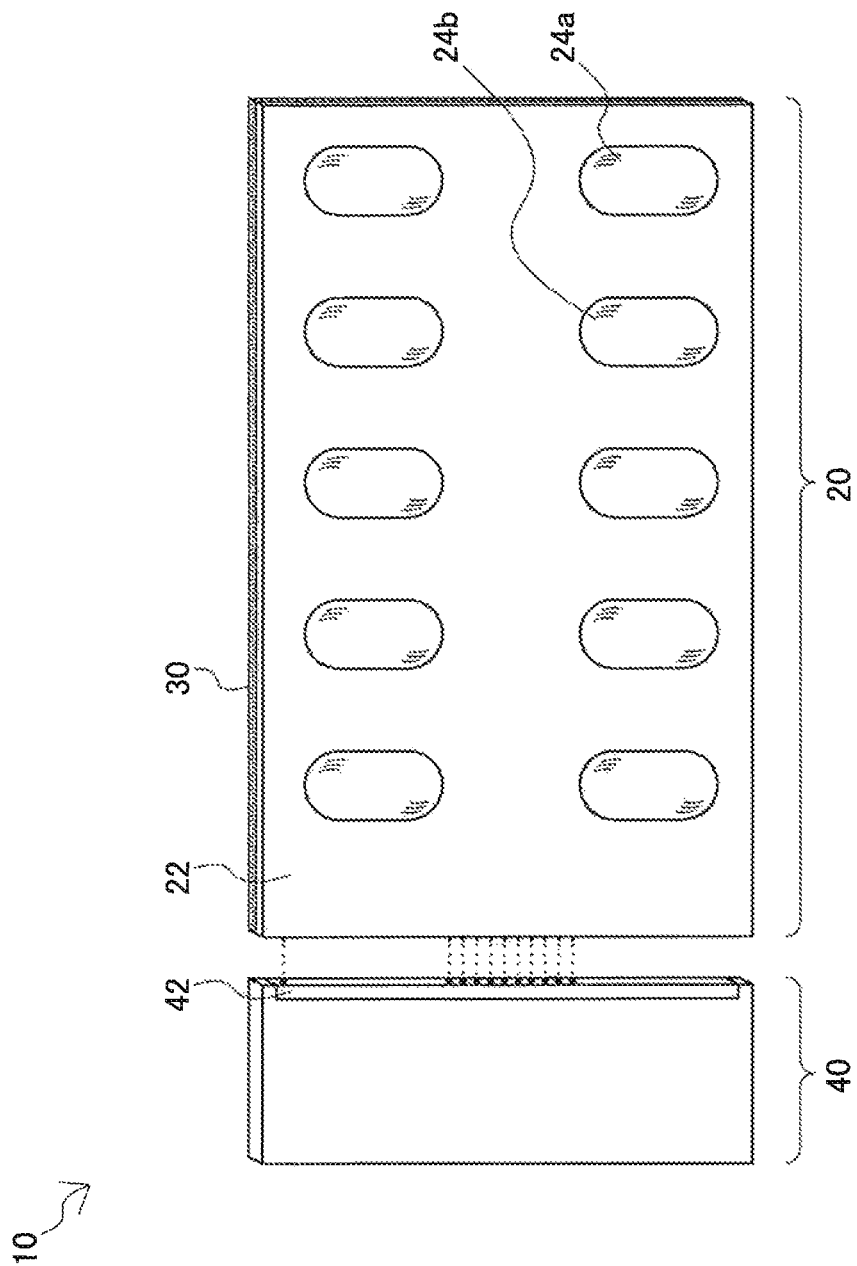
FIG. 1 is a first explanatory diagram for describing an overview of an article packing element according to an embodiment.
Figure 2:
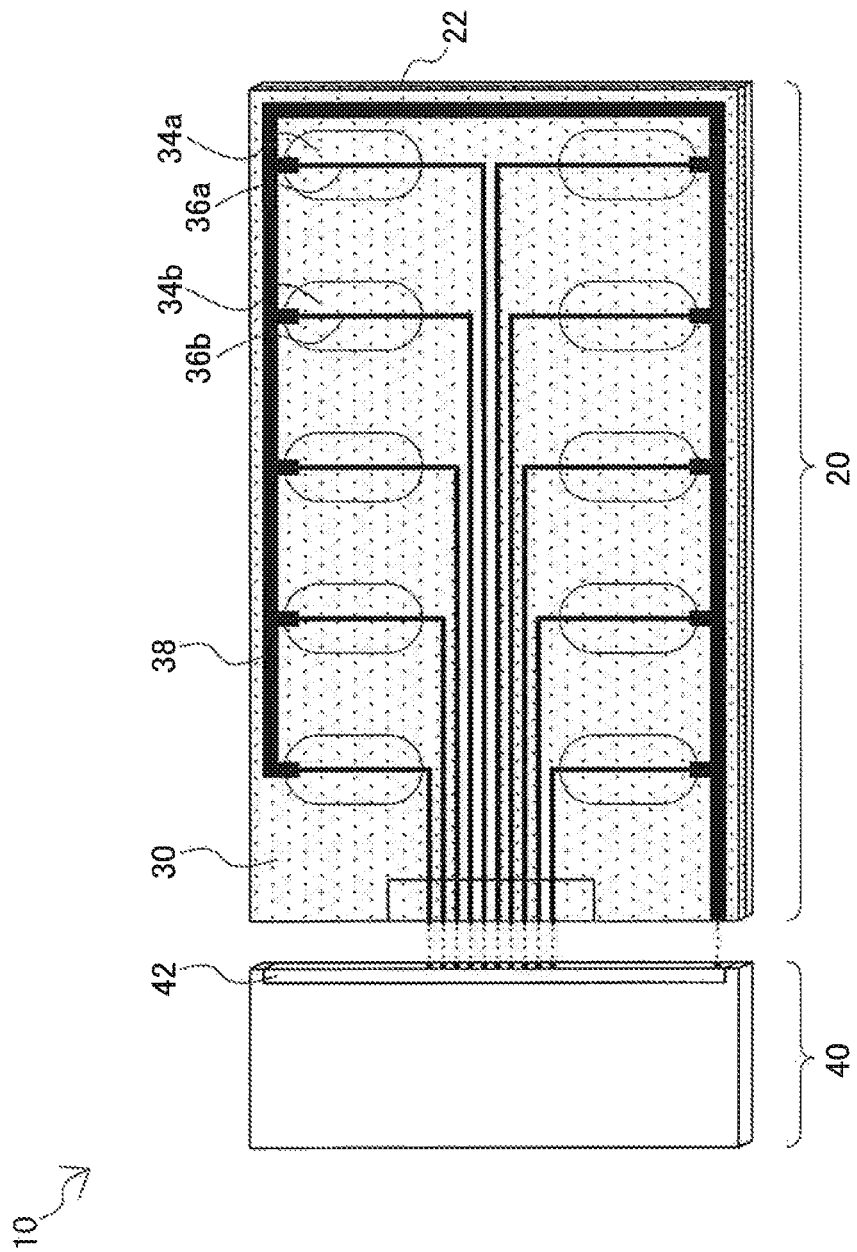
FIG. 2 is a second explanatory diagram for describing an overview of an article packing element according to an embodiment.

First, using FIGS. 1 and 2, an overview of an article packing element according to an embodiment will be described. In FIG. 1, the exterior appearance of the article packing element 10 seen from a certain direction is illustrated, in FIG. 2, the exterior appearance of the article packing element 10 seen from the opposite direction to FIG. 1 is illustrated. The article packing element 10 includes a package 20 and a seal breakage detecting module 40. The package 20 is what is called a blister pack, and includes a package main body 22 and a film 30.

The package main body 22 is formed by molding a plastic sheet of a material such as polyethylene, polypropylene, polystyrene, polyvinyl chloride, or polyethylene terephthalate, for example, in such a manner to form one or more container portions 24a, 24b, . . . . Each container portions 24a, 24b, . . . is a recessed portion of the package main body 22.

The film 30 may be a thin film of a single layer or multi layers of a breakable material. The film 30 is bonded over one surface of the package main body 22, and seals the inside spaces of the container portions 24a, 24b, . . . for containing articles. The film 30 includes one or more signal lines 36a, 36b, . . . arranged to extend through container portion regions 34a, 34b, . . . corresponding to the respective container portions 24a, 24b, . . . . Each signal line 36a, 36b, . . . is formed of a breakable material having electrical conductivity. For example, the signal line 36a extends through the container portion region 34a. When a user presses the container portion 24a containing an article, the signal line 36a is broken along with the film 30 at the container portion region 34a and the container portion 24a is opened. In this way, the user can take out the article contained in the container portion 24a. The signal lines 36a, 36b, . . . are each a branch line from a common line 38. The signal lines 36a, 36b, . . . and the common line 38 are connected to a terminal section 42 of the seal breakage detecting module 40.

Note that, in the present specification, when it is needless to distinguish the container portions 24a, 24b, . . . from each other, these are collectively referred to as the container portion 24 by omitting the last alphabet of the reference sign. The same thing can be said to the container portion regions 34a, 34b, . . . (the container portion region 34) and the signal lines 36a, 36b, . . . (the signal line 36).

The package 20 is not limited to an example of FIG. 1, but may include any number of container portions 24. The container portion 24 may have any shape and size. The container portion 24 can contain various types of articles, such as medicine, food, or cosmetics. A blister pack for containing medicine can be also referred to as a press through package (PTP) pack.

The seal breakage detecting module 40 is a module for detecting the seal breakage of each container portion 24. In the present embodiment, the seal breakage detecting module 40 transmits a signal to one or more signal lines 36, and detects the seal breakage of the container portion 24 corresponding to the container portion region 34, on the basis of whether the transmitted signal returns via the container portion region 34.

2. Exemplary Configuration of Seal Breakage Detecting Module

Figure 3:
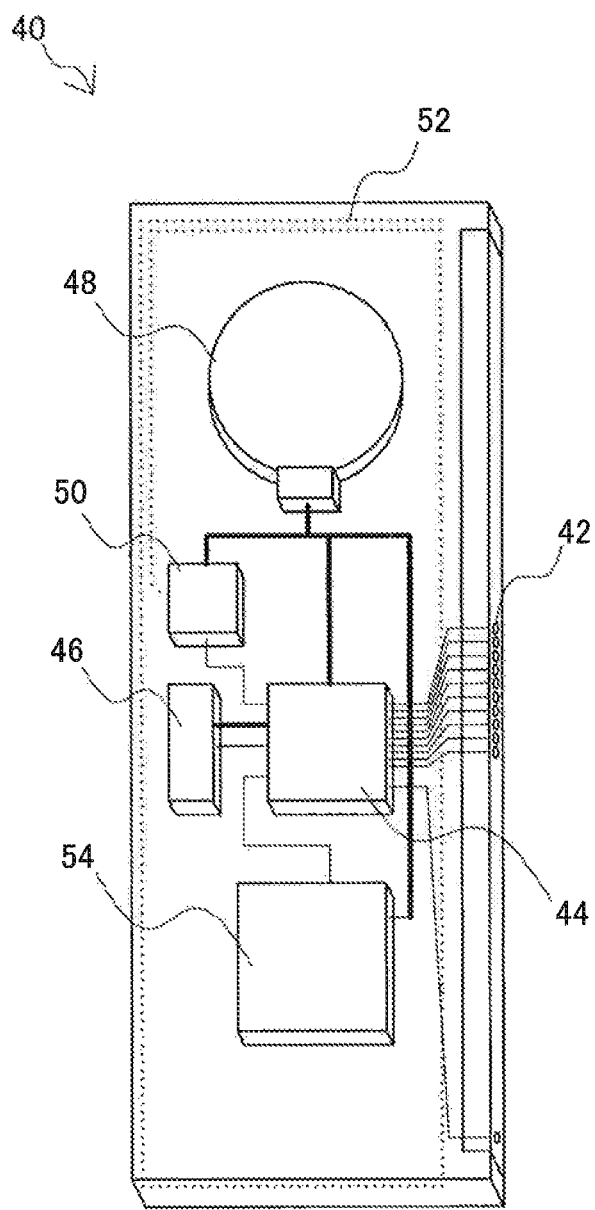
FIG. 3 is an explanatory diagram for describing an example of a detailed configuration of a seal breakage detecting module.

FIG. 3 is an explanatory diagram for describing an example of the detailed configuration of the seal breakage detecting module 40. The seal breakage detecting module 40 includes a terminal section 42, a signal processing device 44, a quartz oscillator 46, a battery 48, a communication interface 50, an antenna 52, and a buzzer 54.

The terminal section 42 includes one or more connection terminals for connecting the signal processing device 44 (for example, a general purpose input/output (GPIO) of the signal processing device 44) to one or more signal lines 36 and the common line 38 of the package 20. The signal processing device 44 is a micro controller including a processor that executes a program for detecting the seal breakage of the container portion 24, and a memory (non-transitory media) that stores the program. The quartz oscillator 46 is used, so that the signal processing device 44 can accurately measure a time. Note that the signal processing device 44 may measure the time, using an internal clock, without using the quartz oscillator 46. In that case, the seal breakage detecting module 40 is needless to include the quartz oscillator 46. The battery 48 supplies operating electric power to each unit of the seal breakage detecting module 40. The communication interface 50 intermediates the communication between the seal breakage detecting module 40 and an external device. In the example of FIG. 3, the communication interface 50 is a wireless communication interface that operates by a short range communication method such as the near field communication (NFC) method or the Bluetooth (registered trademark) method. The communication interface 50 can transmit the data recorded by the signal processing device 44 to the external device, for example. The antenna 52 is an antenna used to allow the communication interface 50 to transmit or receive a radio signal. Note that the communication interface 50 may be a wired communication interface that operates by a universal serial bus (USB) method, for example. In that case, the seal breakage detecting module 40 is needless to include the antenna 52. The buzzer 54 is an alarm device that issues a warning sound in one or more alarm patterns in accordance with the control by the signal processing device 44. The seal breakage detecting module 40 is needless to include the buzzer 54, and instead may include an alarm device of another type. The seal breakage detecting module 40 is needless to alarm necessarily.

3. Exemplary Configuration of Signal Processing Device

FIG. 4 is an explanatory diagram for describing an example of the configuration of logical functions that can be configured by the processor and the memory of the signal processing device 44. Referring to FIG. 4, the signal processing device 44 includes a detection unit 60, a time measuring unit 62, a data storage unit 64, a data input-output unit 66, and an alarm control unit 68.

(1) Detection Unit

The detection unit 60 transmits a test signal to one or more signal lines 36 via the terminal section 42, and detects the seal breakage of each container portion 24 on the basis of whether the transmitted test signal returns via the container portion region 34 corresponding to the container portion 24. For example, the detection unit 60 can detect the breakage of the seal of the container portion 24a, if the test signal does not return via the container portion region 34a when a predetermined delay time has elapsed since the transmission time of the test signal that is to pass through the container portion region 34a corresponding to the container portion 24a. In the same way, the detection unit 60 can detect the breakage of the seal of the container portion 24b, if the test signal does not return via the container portion region 34b when a predetermined delay time has elapsed since the transmission time of the test signal that is to pass through the container portion region 34b corresponding to the container portion 24b. For example, the detection unit 60 can determine the return of the test signal, by checking the status (Low or High) of the GPIO of the micro controller at the timing the test signal is to return. Thus, according to this method, AD conversion for reading the magnitude of an electrical current is unnecessary. Also, it is unnecessary to exactly adjust the characteristics, such as the impedance or the resistance, of the circuit.

The time length from transmission to return of the test signal mainly depends the characteristic value, such as the length, the resistance, and the capacity, of the signal line, and can be a value from several nsec to several hundred nsec, for example. A sufficient spared time is secured for checking the return of the test signal, by using the pulse signal having a predetermined pulse width as the test signal. Also, the pulse width of the pulse signal serves to absorb the fluctuation of the delay time, and to prevent the detection failure of the seal breakage. Note that the electric power consumption of the signal processing device 44 can be increased by making the pulse width longer. The optimal value of the pulse width can be set in advance.

The detection unit 60 repeats transmission of the test signal and monitoring of the return of the transmitted signal by the number of the container portions 24 (10 in the example of FIGS. 1 and 2), in order to know which container portion 24 is opened by the user. The detection unit 60 typically executes this test at time intervals. The test cycle may be selected, depending on its purpose. For example, a shorter time interval can be adopted when the exactness of the record of the seal breakage time is requested, and a longer time interval can be adopted when the length of the battery lifetime is prioritized. Once the breakage of a seal of a certain container portion 24 is detected, the detection unit 60 is needless to determine whether the test signal that passes through the container portion region 34 corresponding to the container portion 24 returns. This shortens the time necessary for the test, and reduces the electric power consumption.

One of the signal line of the outward path of the test signal and the signal line of the return path of the test signal may be commonalized between a plurality of container portions 24. In the example illustrated in FIG. 2, one or more signal lines 36 are branch lines that branch from the common line 38. In the first working example, the detection unit 60 transmits a test signal to the branch lines 36 that extend through the container portion regions 34, and determines whether the test signal returns from the common line 38. In the second working example, the detection unit 60 transmits a test signal to the common line 38, and determines whether the test signal returns from the branch lines 36 that extend through the respective container portion regions 34. In either case, as a result of partially cominonalizing the signal line, the circuit size is reduced, and a limited number of GPIOs of the micro controller is used efficiently.

Figure 5A:
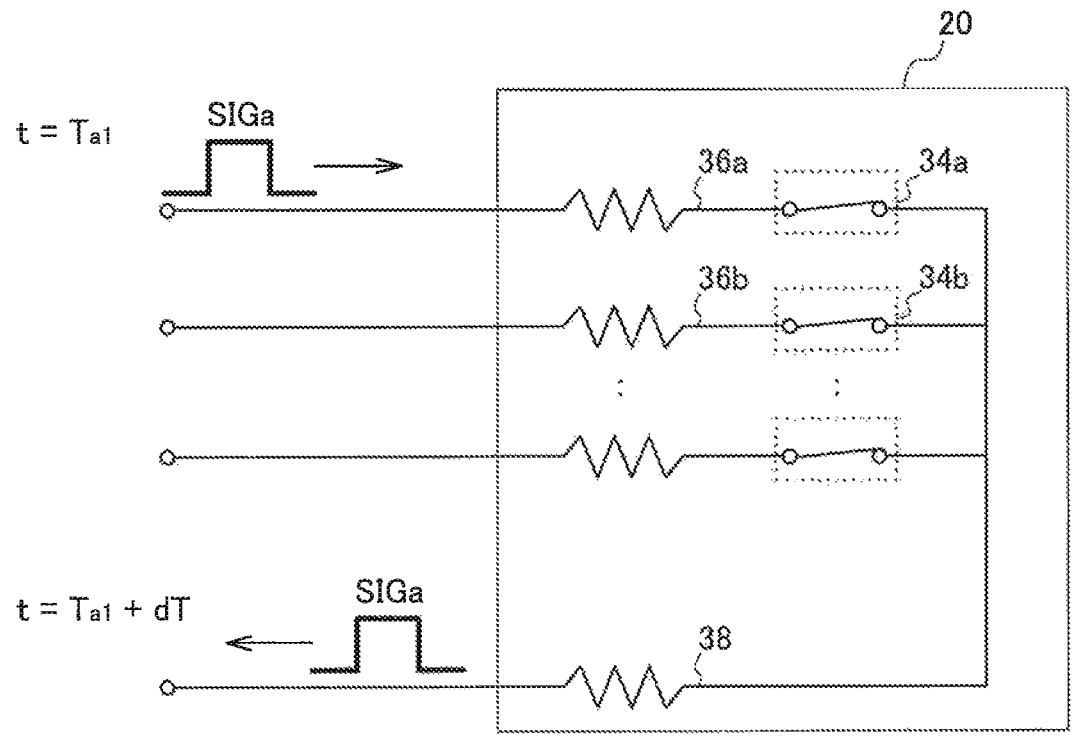
FIG. 5A is a first explanatory diagram for describing a first working example of a seal breakage detecting process.
Figure 5B:
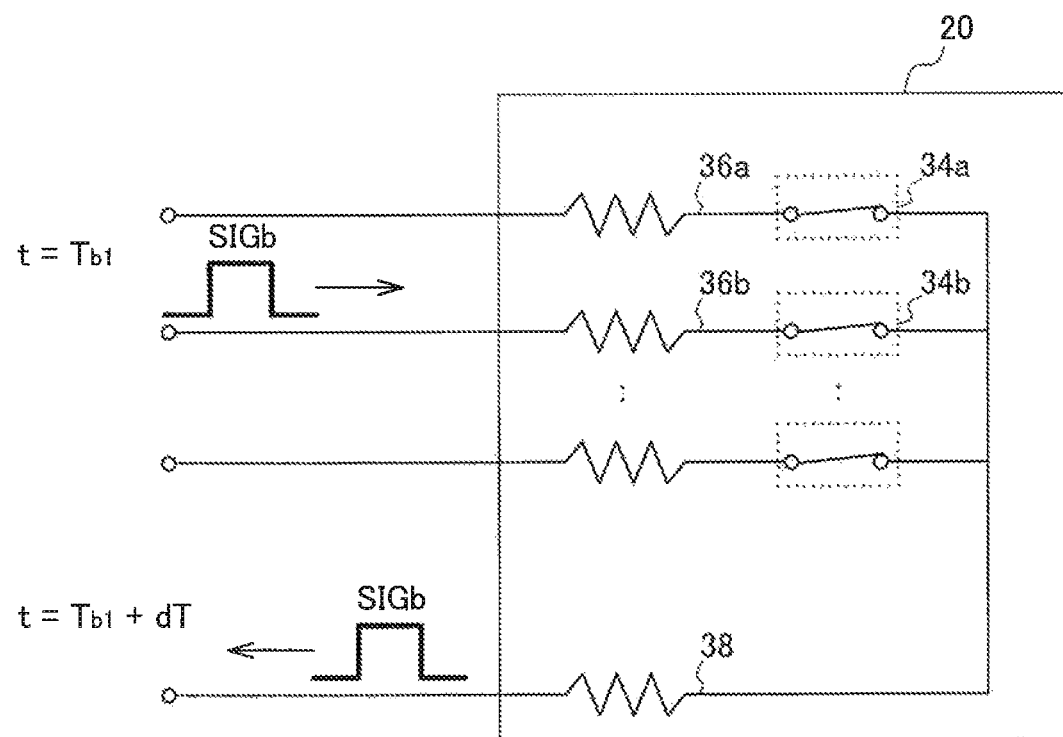
FIG. 5B is a second explanatory diagram for describing a first working example of a seal breakage detecting process.
Figure 5C:
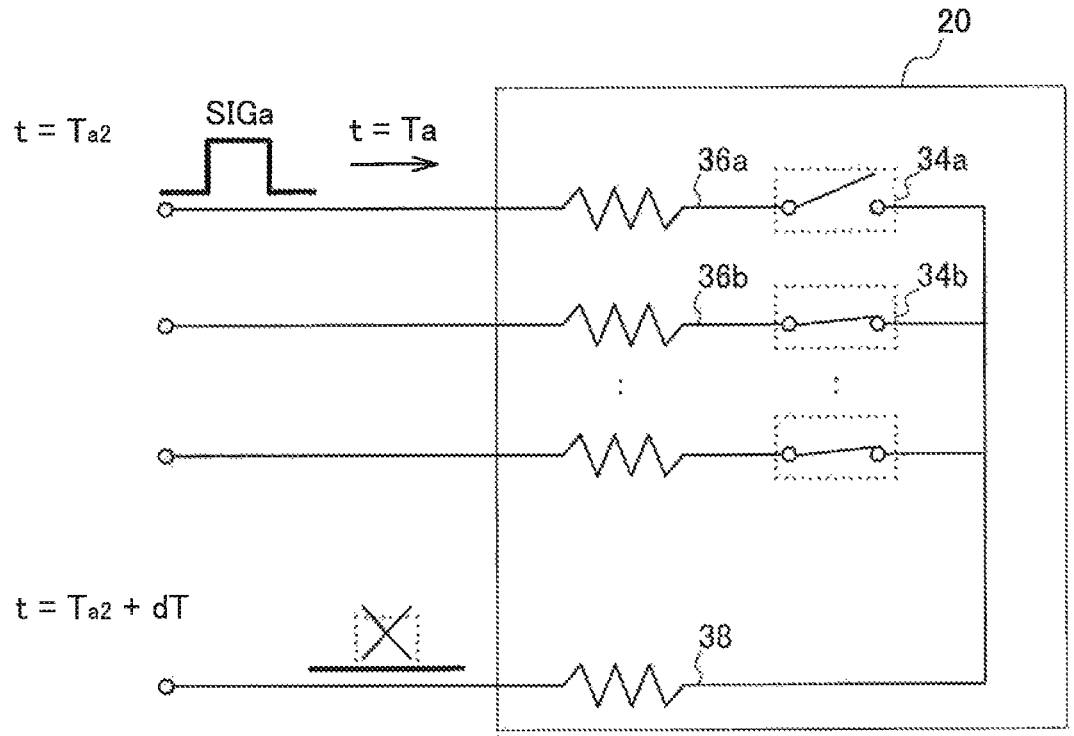
FIG. 5C is a third explanatory diagram for describing a first working example of a seal breakage detecting process.

FIGS. 5A to 5C are explanatory diagrams for describing the first working example of the seal breakage detecting process. In FIGS. 5A to 5C, an equivalent circuit of a plurality of branch lines 36a, 36b, . . . and the common line 38 is illustrated schematically. For example, the branch line 36a and the branch line 36b extend through the container portion region 34a and the container portion region 34b which are modeled as switches, respectively. When the container portion 24a is opened, the branch line 36a breaks in the container portion region 34a, and this is indicated as the opening of the switch. In the same way, when the container portion 24b is opened, the branch line 36b breaks in the container portion region 34b, and this is indicated as the opening of the switch. Referring to FIG. 5A, the test signal SIGa is transmitted to the branch line 36a, at the time $t=T_{a1}$. The container portion 24a is not opened yet, and thus the test signal SIGa returns from the common line 38 via the container portion region 34a. The detection unit 60 recognizes that the test signal SIGa has returned, by checking the status of the GPIO to which the common line 38 is connected, at the time $t=T_{a1}+dT$. Thereafter, referring to FIG. 5B, the test signal SIGb is transmitted to the branch line 36b, at the time $t=T_{b1}$. The container portion 24b is not opened yet, and thus the test signal SIGb returns from the common line 38 via the container portion region 34b. The detection unit 60 recognizes that the test signal SIGb has returned, by checking the status of the GPIO to which the common line 38 is connected, at the time $t=T_{b1}+dT$. With respect to other branch lines, the same test is executed sequentially. It is assumed that the container portion 24a is thereafter opened while one test cycle is elapsing. Referring to FIG. 5C, the test signal SIGa is transmitted to the branch line 36a, at the time $t=T_{a2}$. The branch line 36a has broken in the container portion region 34a due to the seal breakage of the container portion 24a, and thus the test signal SIGa does not return via the container portion region 34a. The detection unit 60 recognizes that the test signal SIGa does not return, by checking the status of the GPIO to which the common line 38 is connected, at the time $t=T_{a2}+dT$, in order to detect the seal breakage of the container portion 24a.

Figure 6:
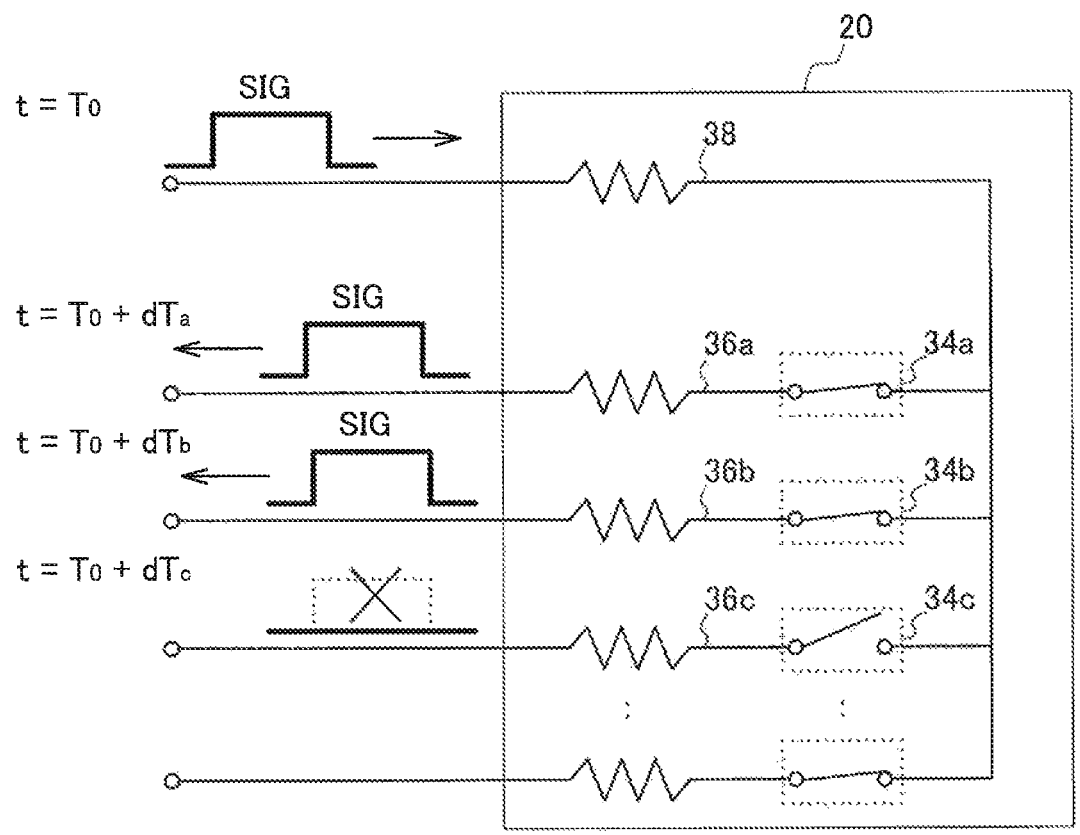
FIG. 6 is an explanatory diagram for describing a second working example of a seal breakage detecting process.

FIG. 6 is an explanatory diagram for describing the second working example of the seal breakage detecting process. In FIG. 6 as well, an equivalent circuit of a plurality of branch lines 36a, 36b, 36c . . . and the common line 38 are illustrated schematically. Referring to FIG. 6, the test signal SIG is transmitted to the common line 38, at the time $t=T_0$. The container portion 24a and the container portion 24b are not opened yet. On the other hand, the container portion 24e is opened already. The detection unit 60 recognizes that the test signal SIG has returned via the container portion region 34a, by checking the status of the GPIO to which the branch line 36a is connected, at the time $t=T_0+dT_a$. Thereafter, the detection unit 60 recognizes that the test signal SIG has returned via the container portion region 34b, by checking the status of the GPIO to which the branch line 36b is connected, at the time $t=T_0+dT_b$. Thereafter, the detection unit 60 recognizes that the test signal SIG does not return via the container portion region 34b, by checking the status of the GPIO to which the branch line 36c is connected, at the time $t=T_0+dT_c$, in order to detect the seal breakage of the container portion 24c.

The detection unit 60 records the result of the seal breakage detection with respect to each container portion 24, in seal breakage time data 70. The seal breakage time data 70 typically includes a set of flags indicating which container portion 24 is opened and a list of seal breakage times. The detection unit 60 may record the seal breakage time data 70 in association with a user's identifier acquired in advance from an external device via the communication interface 50. Thereby, the seal breakage time data 70 can be managed for each user. An example of the configuration of the seal breakage time data 70 will be described later in more detail.

(2) Time Measuring Unit

The time measuring unit 62 measures a time, using the clock provided from the quartz oscillator 46 or the internal clock of the signal processing device 44. The detection unit 60 can refer to the time measured by the time measuring unit 62, for the purpose of timer control of test cycle, countdown of delay time, and acquisition of seal breakage time with respect to each container portion 24, for example. Also, the alarm control unit 68, describe later, can refer to the time measured by the time measuring unit 62, for the control of the alarm.

(3) Data Storage Unit

The data storage unit 64 store the seal breakage time data 70 which is the record of the result of the seal breakage detection with respect to each container portion 24. FIG. 7 is an explanatory diagram illustrating an example of the configuration of the seal breakage time data 70. Referring to FIG. 7, the seal breakage time data 70 includes "user ID" and "article ID" as data items, and "seal breakage flag" and "seal breakage time" with respect to each container portion 24.

The "user ID" is an identifier of a user that uses the article contained in the container portion 24 of the article packing element 10. When a medicine is contained in the container portion 24, the user means the patient that takes the medicine. The "article ID" is an identifier that identifies the article contained in the container portion 24 of the article packing element 10. In addition to or instead of the "article ID", the seal breakage time data 70 may include the name of the contained article. The "user ID" and "article ID" are acquired in advance by the data input-output unit 66, and are written into the data storage unit 64, for example. The "seal breakage flag" is a flag indicating whether or not the seal breakage is detected with respect to each container portion 24. When the "seal breakage flag" indicates true, the corresponding container portion 24 is opened already. When the "seal breakage flag" indicates false, the corresponding container portion 24 is not opened yet. The "seal breakage time" is a time at which the seal breakage is detected with respect to each container portion 24. The "seal breakage time" may be a blank, with respect to the container portion 24 whose "seal breakage flag" indicates false.

As one example, the article packing element 10 can be utilized for support administration of the medicine. In that use case, the data storage unit 64 additionally stores administration schedule data 72. For example, the administration schedule data 72 can be created using a computer (an external device) by a medical doctor, a pharmacist, or a patient himself or herself, and can be acquired in advance via the communication interface 50. As a simple example, the administration schedule data 72 may be a list of the administration schedule time illustrated in FIG. 8. The administration schedule data 72 may also include a user ID and an article ID.

(4) Data Input-Output Unit

The data input-output unit 66 manages input and output of the data between the seal breakage detecting module 40 and the external device. For example, when data, such as a user ID, an article ID, or the administration schedule data 72, is received by the communication interface 50 from the external device, the data input-output unit 66 writes the received data into the data storage unit 64. The data input-output unit 66 may acquire a program of a new version via the communication interface 50, for updating the program (software or firmware) of the signal processing device 44. Also, the data input-output unit 66 outputs, to an external device, the seal breakage time data 70 recorded by the detection unit 60 with respect to each container portion 24, in response to a data request received via the communication interface 50.

As one example, the article packing element 10 can be utilized for data analysis for the purpose of clinical trial for medicine, academic research, or user's health management. In these use cases, the seal breakage time data 70 can be output to an external device which is a computer for data analysis. Then, the seal breakage time data 70 is compared with user's living body indexes (blood pressure, body weight, uric acid value, blood-cholesterol level, etc) measured separately for example, in order to analyze the relationship between the administration of medicine and the change of the living body indexes. For example, the external device includes a wireless communication interface or a wired communication interface operated by a near field communication method, and acquires the seal breakage time data 70 from the seal breakage detecting module 40. The external device may be any type of device, such as a personal computer (PC), a smartphone, a personal digital assistants (PDA), or a workstation.

(5) Alarm Control Unit

The alarm control unit 68 controls the alarm for the user, which uses an alarm device such as the buzzer 54 illustrated in FIG. 3. For example, the alarm control unit 68 may inform the user that the seal breakage of the container portion 24 is detected by the detection unit 60. Also, in the use of the administration support of the medicine, the alarm control unit 68 may inform the user of a timing to take the medicine contained in each container portion 24, in accordance with the administration schedule data 72 acquired in advance. Also, the alarm control unit 68 may determine an administration error of the medicine by checking the seal breakage time data 70 recorded with respect to each container portion 24 against the administration schedule data 72 at time intervals, and inform the user of an administration error when the administration error is found. For example, the alarm control unit 68 can find the fact that the user has forgotten to take the medicine as an administration error, when the number of medicines that are to have been taken in the administration schedule data 72 is greater than the number of already-opened container portions 24. Also, the alarm control unit 68 can find the fact that the user has excessively taken the medicine as an administration error, when the number of medicines that are to have been taken in the administration schedule data 72 is smaller than the number of already-opened container portions 24. The alarm control unit 68 may execute these alarms in different alarm patterns, depending on the reason of alarm. For example, the alarm control unit 68 may emit a warning sound from the buzzer 54, or cause a light emitting device (such as an LET)) not illustrated in the drawing to emit a light, or cause a vibrator to vibrate.

4. Sequence of Process 4-1. Seal Breakage Detecting Process

First Working Example

Figure 9:
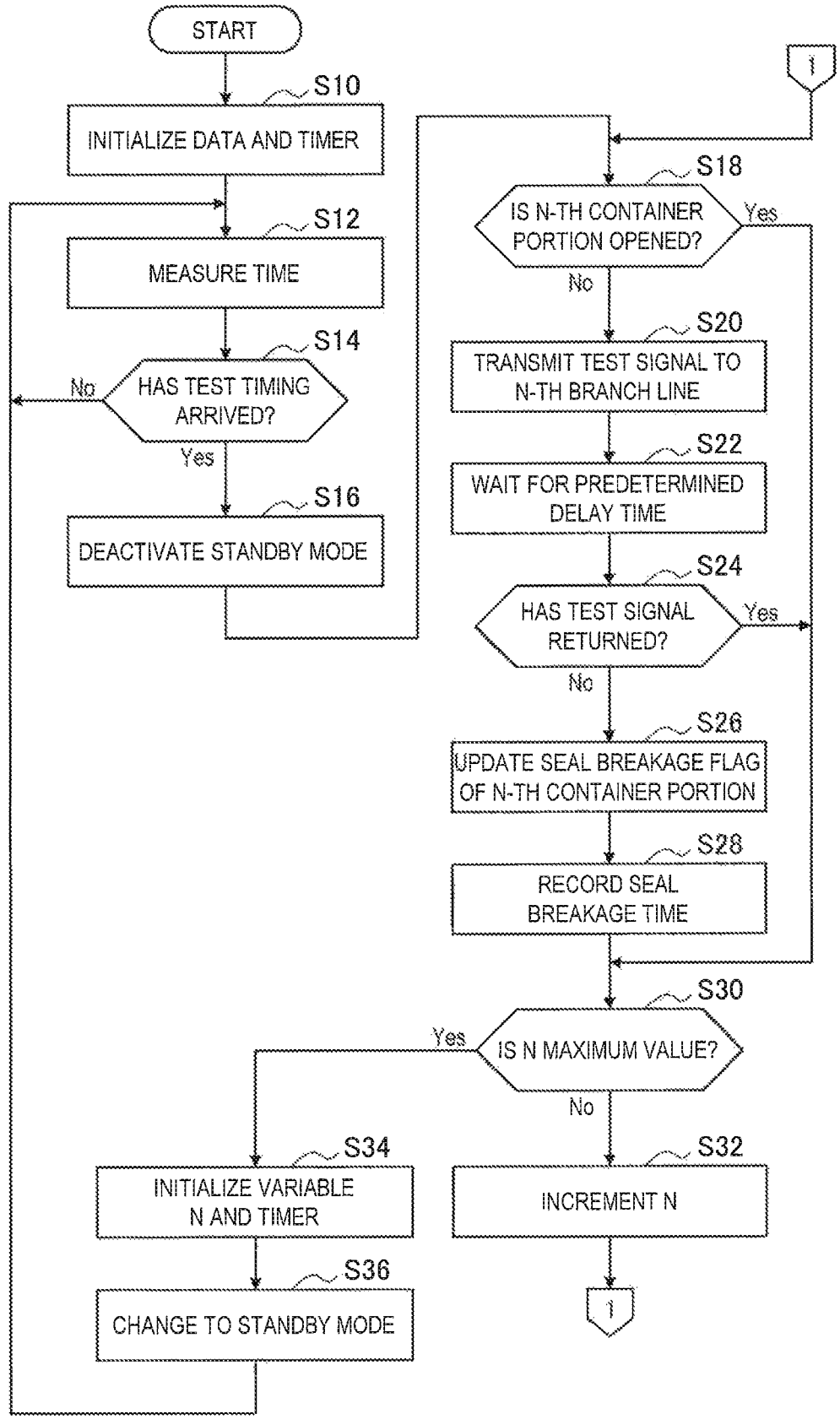
FIG. 9 is a flowchart illustrating an example of a sequence of a seal breakage detecting process in a first working example.

FIG. 9 is a flowchart illustrating an example of the sequence of the seal breakage detecting process that can be executed by the detection unit 60 in the first working example.

Referring to FIG. 9, first, the detection unit 60 initializes data and a timer for test cycle (step S10). The seal breakage time data 70 can be initialized in such a manner that all seal breakage flags indicate false and all seal breakage times become blanks. The user ID and the article ID can be initialized at a value acquired in advance via the communication interface 50. A control variable n used to scan each of the container portions 24 can be initialized at zero.

Thereafter, the detection unit 60 causes the time measuring unit 62 to measure a time (step S12). Then, when the timer for the test cycle expires, the detection unit 60 determines that the test timing has arrived (step S14), and changes the operation mode of the signal processing device 44 from a standby mode of a low electric power consumption to a normal mode (step S16).

Thereafter, the detection unit 60 determines whether the n-th container portion 24 is opened, with reference to the n-th seal breakage flag of the seal breakage time data 70 (step S18). If the n-th container portion 24 is opened, the subsequent processes of step S20 to step S28 are skipped.

If the n-th container portion 24 is not opened, the detection unit 60 transmits a test signal to the n-th branch line 36 (step S20), and thereafter the detection unit 60 waits for a predetermined delay time (step S22). Then, the detection unit 60 determines whether or not the test signal has returned via the region corresponding to the n-th container portion 24, when the predetermined delay time has elapsed since the transmission time of the test signal (step S24). Here, if it is determined that the test signal has returned, the subsequent processes of step S26 and step S28 are skipped.

If it is determined that the test signal does not return, the detection unit 60 updates the seal breakage flag of the n-th container portion 24, to the true value indicating that the seal breakage is detected (step S26). Also, the detection unit 60 acquires the seal breakage time from the time measuring unit 62, and records the acquired seal breakage time in the seal breakage time data 70 (step S28).

When the test described above with respect to the n-th container portion 24 ends, the detection unit 60 determines whether the value of n is equal to the maximum value (step S30). Here, if the value of n is not equal to the maximum value, the value of n is incremented (step S32), and the test of step S18 to step S28 is repeated with respect to the next container portion 24. If the value of n is equal to the maximum value, the detection unit 60 initializes the variable n and the timer (step S34), and changes the operation mode of the signal processing device 44 to the standby mode of low electric power consumption (step S36). Then, the process illustrated in FIG. 9 returns to step S12.

4-2. Seal Breakage Detecting Process

Second Working Example

Figure 10:
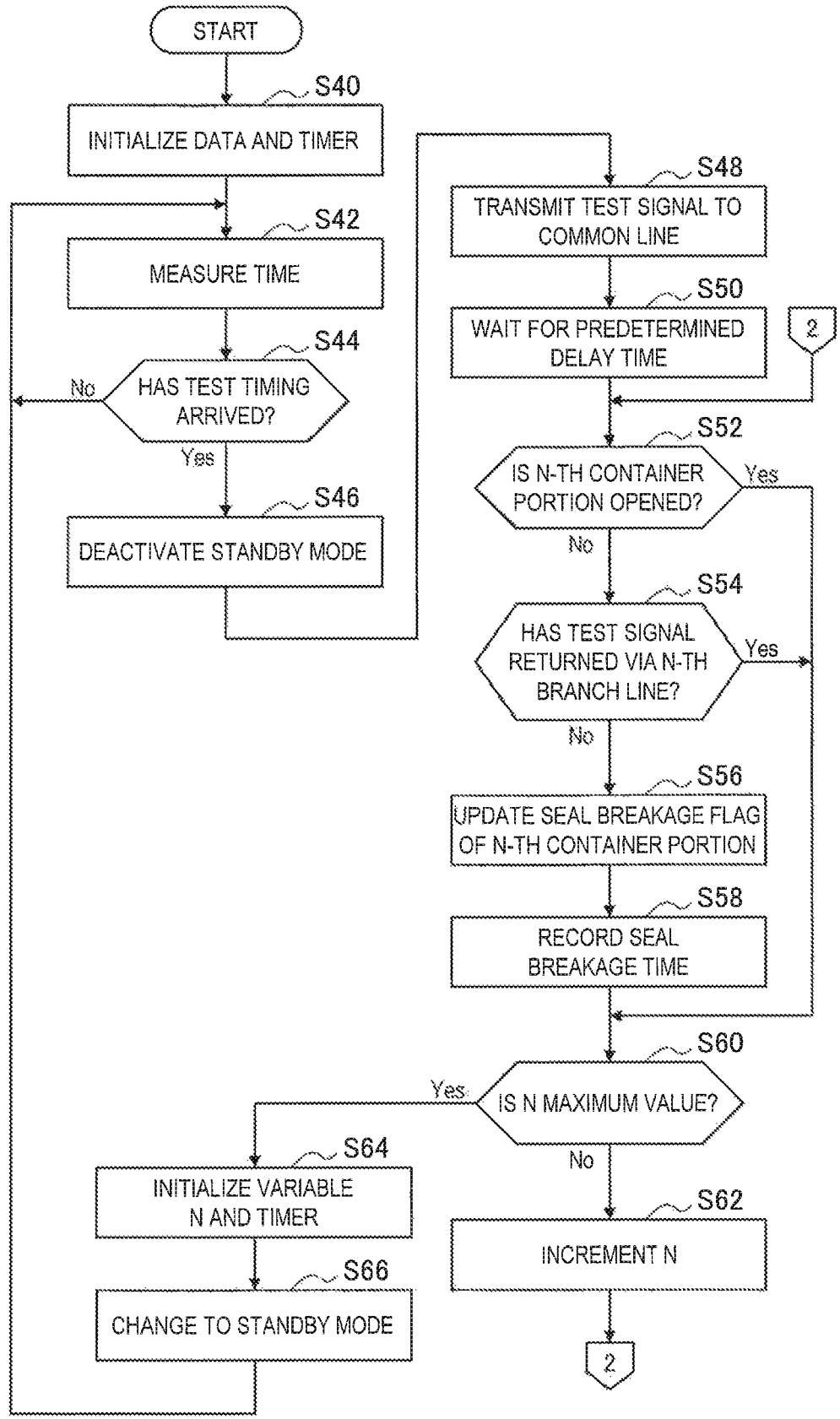
FIG. 10 is a flowchart illustrating an example of a sequence of a seal breakage detecting process in a second working example.

FIG. 10 is a flowchart illustrating an example of the sequence of the seal breakage detecting process that can be executed by the detection unit 60 in the second working example.

Referring to FIG. 10, first, the detection unit 60 initializes data and a timer for test cycle (step S40). The seal breakage time data 70 can be initialized in such a manner that all seal breakage flags indicate false and all seal breakage times become blanks. The user ID and the article ID can be initialized at a value acquired in advance via the communication interface 50. A control variable n used to scan each of the container portions 24 can be initialized at zero.

Thereafter, the detection unit 60 causes the time measuring unit 62 to measure a time (step S42). Then, when the timer for the test cycle expires, the detection unit 60 determines that the test timing has arrived (step S44), and changes the operation mode of the signal processing device 44 to a normal mode (step S46).

Thereafter, the detection unit 60 transmits a test signal to the common line 38 (step S48). Thereafter, the detection unit 60 waits for a predetermined delay time (step S50). Also, the detection unit 60 determines whether the n-th container portion 24 is opened, with reference to the n-th seal breakage flag of the seal breakage time data 70 (step S52). If the n-th container portion 24 is opened, the subsequent processes of step S54 to step S58 are skipped.

If the n-th container portion 24 is not opened, the detection unit 60 determines whether or not the test signal has returned via the n-th branch line 36, when the predetermined delay time has elapsed since the transmission time of the test signal (step S54). Here, if it is determined that the test signal has returned via the n-th branch line 36, the subsequent processes of step S56 and step S58 are skipped.

If it is determined that the test signal does not return via the n-th branch line 36, the detection unit 60 updates the seal breakage flag of the n-th container portion 24, to the true value indicating that the seal breakage is detected (step S56). Also, the detection unit 60 acquires the seal breakage time from the time measuring unit 62, and records the acquired seal breakage time in the seal breakage time data 70 (step S58).

When the test described above with respect to the n-th container portion 24 ends, the detection unit 60 determines whether the value of n is equal to the maximum value (step S60). Here, if the value of n is not equal to the maximum value, the value of n is incremented (step S62), and the test of step S52 to step S58 is repeated with respect to the next container portion 24. If the value of n is equal to the maximum value, the detection unit 60 initializes the variable n and the timer (step S64), and changes the operation mode of the signal processing device 44 to the standby mode (step S66). Then, the process illustrated in FIG. 10 returns to step S42.

4-3. Data Output Process

Figure 11:
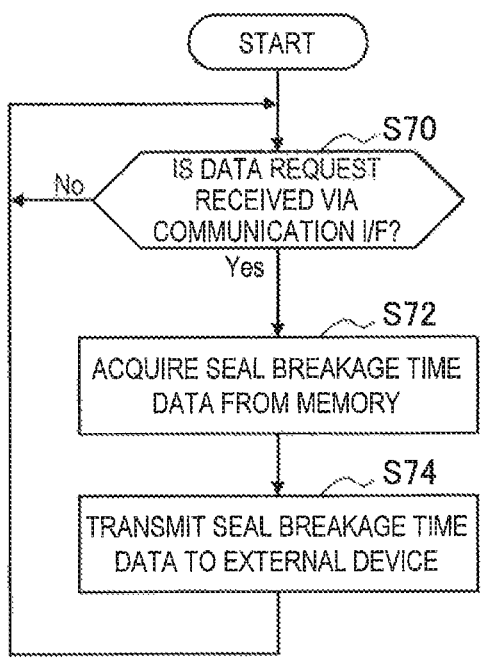
FIG. 11 is a flowchart illustrating an example of a sequence of a data output process.

FIG. 11 is a flowchart illustrating an example of the sequence of a data output process that can be executed by the data input-output unit 66.

Referring to FIG. 11, the data input-output unit 66 awaits reception of a data request via the communication interface 50 (step S70). When a data request is received from an external device, the data input-output unit 66 acquires the seal breakage time data 70 from the data storage unit 64 (step S72). Then, the data input-output unit 66 transmits the acquired seal breakage time data 70 to the requesting external device via the communication interface 50 (step S74).

4-4. Administration Support Process

Figure 12:
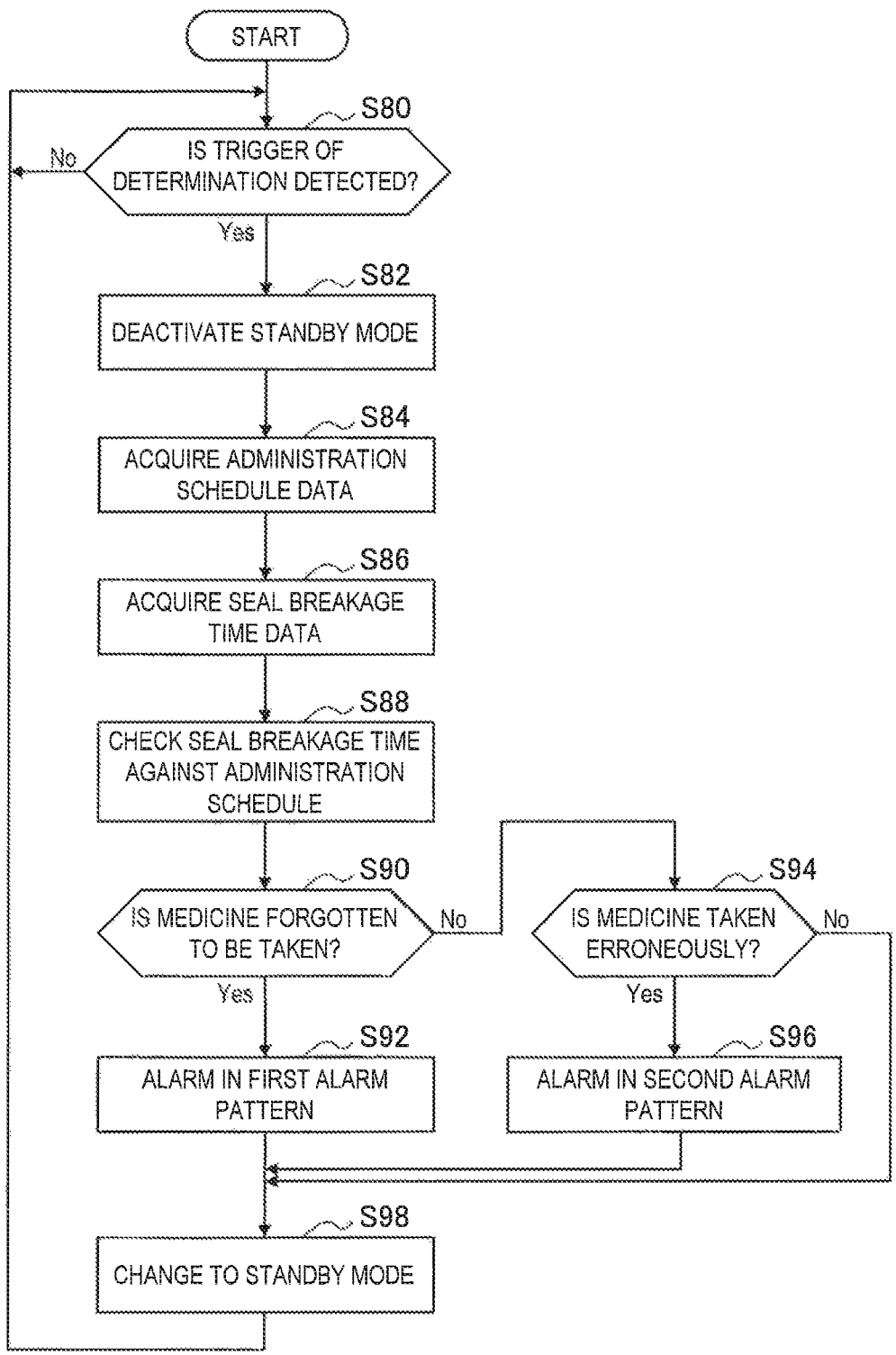
FIG. 12 is a flowchart illustrating an example of a sequence of an administration support process.

FIG. 12 is a flowchart illustrating an example of the sequence of the administration support process that can be executed by the alarm control unit 68.

Referring to FIG. 12, the alarm control unit 68 awaits a trigger for determining whether to perform an alarm (step S80). Here, the trigger may be cyclic arrival of determination timing, reception of a determination request from an external device, or press of a button additionally provided to the seal breakage detecting module 40, for example. The operation of the user who performs "touch" of the seal breakage detecting module 40 onto the external device may be detected by the communication interface 50 to be handled as the above trigger of determination.

When a trigger for determining whether to perform an alarm is detected, the alarm control unit 68 changes the operation mode of the signal processing device 44 from the standby mode to the normal mode (step S82). Thereafter, the alarm control unit 68 acquires the administration schedule data 72 from the data storage unit 64 (step S84). Also, the alarm control unit 68 acquires the seal breakage time data 70 from the data storage unit 64 (step S86). Then, the alarm control unit 68 checks the seal breakage time of the container portion 24 recorded by the detection unit 60 by then, against the administration schedule indicated by the administration schedule data 72 (step S88). The subsequent process branches depending on the result of the check.

If the alarm control unit 68 finds that the medicine is forgotten to be taken as the result of the check (step S90), the alarm control unit 68 performs an alarm to the user in a first alarm pattern (step S92). Also, if the alarm control unit 68 finds that the medicine is taken erroneously as the result of the check (step S94), the alarm control unit 68 performs an alarm to the user in a second alarm pattern (of a different warning sound, light emission color, light emission pattern, or vibration pattern) (step S96). Thereafter, the alarm control unit 68 changes the operation mode of the signal processing device 44 to the standby mode (step S98). Then, the process illustrated in FIG. 12 returns to step S80.

5. Conclusion

In the above, using FIGS. 1 to 12, an embodiment of the technology according to the present disclosure has been described in detail. According to the above embodiment, a test signal is transmitted to one or more signal lines formed of a breakable material in such a manner to pass through the respective regions corresponding to one or more container portions of a package having the one or more container portions for containing articles, and the seal breakage of each container portion is detected on the basis of whether the test signal returns via each region. Thus, it is unnecessary to mount an AD converter to detect the seal breakage of the containers portion, and the increase of the circuit size and the increase of the electric power consumption are both reduced. Also, it is unnecessary to adjust characteristics, such as impedance or resistance, of the circuit, and therefore the size and the shape of the package of the article packing element is prevented from restriction.

For example, a method of detecting the seal breakage by recognizing an interruption of the signal line breakage is also considered. However, such a method requires that the number of the provided interrupt terminals is same as the number of the container portions, and thus makes it difficult to implement with a general-purpose micro controller. Further, in the method that utilizes an interrupt, a pull-up resistor or a pull-down resistor must be added to each container portion, resulting in restriction generated in the line resistance value in relationship to a high level voltage VIH and a low level voltage VIL. On the other hand, in the above embodiment, such a disadvantage does not exist, and a low-cost general-purpose micro controller can be utilized, and the package can be produced in a flexible manner.

Also, according to the above embodiment, if the test signal does not return via the first region when a predetermined delay time has elapsed since the transmission time of the test signal that is to pass through the first region corresponding to the first container portion, breakage of the seal of the first container portion is detected. Thus, the seal breakage of each container portion can be detected, by a simple scheme of checking the status (Low or High) of the input-output terminal of the micro controller at the timing at which the test signal is to return.

Also, according to the above embodiment, one of the outward path of the signal line to the region corresponding to each of the container portions or the return path of the signal line from the region can be commonalized. Thereby, the size of the circuit for detecting the seal breakage can be reduced, and a limited number of input-output terminals of the micro controller can be used efficiently.

Also, according to the above embodiment, the test signal may be a pulse signal having a predetermined pulse width. Thus, a test signal can be formed as a digital signal, using the micro controller. With a sufficient pulse width of the test signal, a fluctuation (an error) of the delay time of the test signal that transmits through the signal line is absorbed by the pulse width, in order to prevent the detection failure of the seal breakage.

Also, according to the above embodiment, the seal breakage time data recorded with respect to each container portion is output to an external device in response to a request received via the communication interface. Thus, by applying the technology according to the present disclosure to the package of various articles which are produced flexibly, the data relevant to the utilization of the article by the user can be collected widely, and the data can be utilized for various usages. In the present specification, although several usages of the article packing element 10 have been mentioned, the article packing element 10 may be utilized for usages other than the above. For example, the article packing element 10 may be utilized for ingestion management of food, survey of utilization situation of cosmetics, quality guarantee at the time of transportation or storage of some sort of articles, or the like.

Note that, when all of the container portions 24 are opened, the package 20 having those container portions 24 can be discarded. The seal breakage detecting module 40 may be discarded together with the connected package 20. Instead, the seal breakage detecting module 40 may be reutilized, by being detached from the discarded package 20 and connected to an unopened new package 20. When the seal breakage detecting module 40 is reutilized, data such as a user ID, an article ID, and administration schedule data 72, as well as a set value such as a pulse width and a delay time, may be updated by the data input-output unit 66.

Further, a series of signal processes described in the present description may be implemented using any one of software (firmware), hardware, and a combination of hardware and software. For example, a program configuring software is stored in a storage medium installed inside or outside each device. Further, for example, each program is read onto a Random Access Memory (RAM) at the time of execution and executed by a processor such as a Central Processing Unit (CPU).

Further, the processes described using the flowcharts in the present description may not necessarily be executed in the order indicated by the flowchart. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A signal processing device including:

a processor that executes a program; and a memory that stores the program for causing the processor to function as a detection unit that transmits a signal to one or more signal lines formed of a breakable material in such a manner that the signal passes through regions corresponding to one or more respective container portions of a package for containing articles, and detects seal breakage of each container portion on the basis of whether the transmitted signal returns via each region.

(2)

The signal processing device according to (1), wherein the detection unit detects seal breakage of a first container portion, in a case in which a first signal does not return via a first region when a predetermined delay time has elapsed since a transmission time of the first signal that is to pass through the first region corresponding to the first container portion.

(3)

The signal processing device according to (2), wherein the one or more signal lines are one or more branch lines that branch from a common line, and the detection unit transmits the first signal to a first branch line that extends through the first region corresponding to the first container portion, and determines whether the first signal returns from the common line.

(4)

The signal processing device according to (2), wherein the one or more signal lines are one or more branch lines that branch from a common line, and the detection unit transmits the first signal to the common line, and determines whether the first signal returns from a first branch line that extends through the first region corresponding to the first container portion.

(5)

The signal processing device according to any one of (2) to (4), wherein the first signal is a pulse signal having a predetermined pulse width.

(6)

The signal processing device according to any one of (2) to (5), wherein the detection unit does not determine whether the first signal returns via the first region, once the detection unit detects the breakage of the seal of the first container portion.

(7)

The signal processing device according to any one of (1) to (6), wherein the processor further functions as a data output unit that outputs seal breakage time data recorded with respect to each container portion by the detection unit, to an external device via a communication interface.

(8)

The signal processing device according to (7), wherein the detection unit records the seal breakage time data in association with a user's identifier acquired in advance via the communication interface.

(9)

The signal processing device according to any one of (1) to (8), wherein the article is a medicine, and the processor further functions as an alarm control unit that notifies a user of a timing to take the medicine contained in each container portion, in accordance with administration schedule data acquired in advance.

(10)

The signal processing device according to any one of (1) to (9), wherein the article is a medicine, and the processor further functions as an alarm control unit that notifies a user of an administration error of the medicine that is determined using seal breakage time data recorded with respect to each container portion by the detection unit.

(11)

A seal breakage detecting module including:

a signal processing device according to any one of (1) to (10); and one or more connection terminals that connects the signal processing device to the one or more signal lines.

(12)

A seal breakage detecting module including:

a signal processing device according to any one of (1) to (10); and a communication interface that transmits data recorded by the signal processing device to an external device.

(13)

The seal breakage detecting module according to (12), wherein the communication interface is a wireless communication interface, and the seal breakage detecting module further includes an antenna used by the wireless communication interface.

(14)
A program for causing a processor of a signal processing device to function as
a detection unit that transmits a signal to one or more signal lines formed of a breakable material in such a manner that the signal passes through regions corresponding to one or more respective container portions of a package for containing articles, and detects seal breakage of each container portion on the basis of whether the transmitted signal returns via each region.

(15)
A seal breakage detecting method executed by a processor of a signal processing device, the seal breakage detecting method including:
transmitting a signal to one or more signal lines formed of a breakable material in such a manner that the signal passes through regions corresponding to one or more respective container portions of a package for containing articles; and
detecting seal breakage of each container portion on the basis of whether the transmitted signal returns via each region.

(16)
An article packing element including:
a package that includes one or more container portions for containing articles;
one or more signal lines that are formed of a breakable material and extend through regions corresponding to the one or more respective container portions of the package; and
a seal breakage detecting module that transmits a signal to the one or more signal lines and detects seal breakage of each container portion on the basis of whether the transmitted signal returns via each region.

REFERENCE SIGNS LIST 10 article packing element
20 package
22 package main body
24 container portion
30 film
34 container portion region
36 signal line (branch line)
38 signal line (common line)
40 seal breakage detecting module
42 terminal section
44 signal processing device
46 quartz oscillator
48 battery
50 communication interface
52 antenna.
54 buzzer

The invention claimed is:

1. A signal processing device comprising:
a processor that is configured to execute a program; and
a non-transitory computer-readable memory that is configured to store the program for causing the processor to execute a method, the method comprising:
transmitting a signal to one or more signal lines formed of a breakable material in such a manner that the signal passes through regions corresponding to one or more respective container portions of a package for containing one or more respective articles; and
detecting seal breakage of each container portion on the basis of whether the transmitted signal returns via each region,
wherein the processor is further configured to determine that the transmitted signal returns by checking a status of a general purpose input/output (GPIO) of the processor,
wherein seal breakage of a first container portion is detected in a case in which a first signal does not return via a first region when a predetermined delay time has elapsed since a transmission time of the first signal that is to pass through the first region corresponding to the first container portion, and
wherein the first signal comprises a pulse signal having a predetermined pulse width, the predetermined pulse width being determined according to a fluctuation of a delay time of the signal transmitted to the one or more signal lines.

2. The signal processing device according to claim 1, wherein the one or more signal lines are one or more branch lines that branch from a common line, and
wherein the first signal is transmitted to a first branch line that extends through the first region corresponding to the first container portion, and seal breakage of the first container portions is detected according to whether the first signal returns from the common line.

3. The signal processing device according to claim 1, wherein the one or more signal lines are one or more branch lines that branch from a common line, and
wherein the first signal is transmitted to the common line, and seal breakage of the first container portions is detected according to whether the first signal returns from a first branch line that extends through the first region corresponding to the first container portion.

4. The signal processing device according to claim 1, wherein no further determination whether the first signal returns via the first region is performed once the breakage of the seal of the first container portion is detected.

5. The signal processing device according to claim 1, wherein the method further comprises:
outputting seal breakage time data recorded with respect to each container portion, to an external device via a communication interface of the signal processing device.

6. The signal processing device according to claim 5, wherein the seal breakage time data is recorded in association with an identifier of the user acquired in advance via the communication interface.

7. The signal processing device according to claim 1, wherein the one or more articles comprise medicine, and wherein the administration schedule data is acquired in advance.

8. The signal processing device according to claim 1, wherein the method executed by the processor further comprises:
performing a first alarm pattern that notifies a user when the detected seal breakage occurs after a timing indicated by administration schedule data and performing a second alarm pattern that notifies the user when the detected seal breakage occurs before the timing indicated by the administration schedule data,
wherein the first alarm pattern is different from the second alarm pattern.

9. The signal processing device according to claim 8, wherein the one or more articles comprise medicine, and wherein the first alarm pattern and the second alarm pattern notify the user according to a type of an administration error of the medicine that is determined using seal breakage time data recorded with respect to each container portion.

10. The signal processing device according to claim 8, wherein the first alarm pattern is different from the second alarm pattern with respect to at least one of a warning sound, a light emission color, a light emission pattern, and a vibration pattern performed according to each alarm pattern.

11. The signal processing device according to claim 1, wherein the predetermined delay time is set according to the predetermined pulse width.

* * * * *